(12) United States Patent
Dunn et al.

(10) Patent No.: US 11,506,053 B2
(45) Date of Patent: Nov. 22, 2022

(54) MACHINE GUIDANCE INTEGRATION

(71) Applicant: COMMONWEALTH SCIENTIFIC AND INDUSTRIAL RESEARCH ORGANISATION, Acton (AU)

(72) Inventors: Mark Dunn, Acton (AU); Peter Reid, Acton (AU); Jeremy Thompson, Acton (AU); Camrin Peacock, Acton (AU); Kevin Saric, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 0 days.

(21) Appl. No.: 16/857,357

(22) Filed: Apr. 24, 2020

(65) Prior Publication Data

US 2021/0017859 A1    Jan. 21, 2021

(30) Foreign Application Priority Data

Jul. 18, 2019 (AU) .................. 2019902545

(51) Int. Cl.
*E21C 41/16* (2006.01)
*G01S 17/00* (2020.01)
(Continued)

(52) U.S. Cl.
CPC .............. *E21C 41/16* (2013.01); *E21C 35/08* (2013.01); *G01S 17/00* (2013.01); *G01S 17/88* (2013.01);
(Continued)

(58) Field of Classification Search
CPC .......... E21C 27/24; E21C 35/08; E21C 35/24; E21C 41/16; E21D 9/003; E21D 9/004;
(Continued)

(56) References Cited

U.S. PATENT DOCUMENTS

| 4,647,784 A | * | 3/1987 | Stephens | ................. G01S 17/87 |
|---|---|---|---|---|
| | | | | 250/559.3 |
| 6,349,249 B1 | * | 2/2002 | Cunningham | ........... G01C 7/06 |
| | | | | 701/28 |

(Continued)

OTHER PUBLICATIONS

Garrido-Jurado, et al: 'Automatic generation and detection of highly reliable fiducial markers under occlusion' (2014 Elsevier Etd).

*Primary Examiner* — Abby J Flynn
*Assistant Examiner* — Michael A Goodwin
(74) *Attorney, Agent, or Firm* — Paul Teng (57) ABSTRACT

Disclosed herein is a system for controlling a mining machine within an underground mine. A rotatable laser source sends laser light and return light sensor receives reflected laser light and provides an indication of distance and return light intensity at multiple different rotation angles. A co-ordinate reference point comprises a pattern of varying reflectivity and provides at least a 2D co-ordinate position. A processor determines an absolute co-ordinate position in space of the mining machine as the mining machine moves through the underground mine. The processor collects intensity values of reflected laser light for multiple respective rotation angles and detects the pattern of the reference point in the multiple intensity values of reflected laser light, and determines the absolute co-ordinate position in space of the mining machine based on spatial information of the detected pattern.

16 Claims, 3 Drawing Sheets

(51) Int. Cl.
*E21C 35/08* (2006.01)
*G01S 17/88* (2006.01)
*G01S 17/931* (2020.01)
*E21D 9/10* (2006.01)
*E21C 35/24* (2006.01)
*E21D 9/00* (2006.01)

(52) U.S. Cl.
CPC ............ *G01S 17/931* (2020.01); *E21C 35/24* (2013.01); *E21D 9/004* (2013.01); *E21D 9/108* (2013.01); *G01S 2201/02* (2019.08); *G05D 2201/021* (2013.01)

(58) Field of Classification Search
CPC ....... E21D 9/108; G01S 7/4808; G01S 17/00; G01S 17/74; G01S 17/86; G01S 17/88; G01S 17/89; G01S 17/93; G01S 17/931; G01S 2201/02; G05D 1/00; G05D 1/0246; G05D 2201/021
See application file for complete search history.

(56) References Cited

U.S. PATENT DOCUMENTS

| | | | |
|---|---|---|---|
| 9,146,106 B2 | 9/2015 | Bank | |
| 2003/0052529 A1* | 3/2003 | Hakkinen | G05D 1/0246 299/1.05 |
| 2010/0114416 A1 | 5/2010 | Au et al. | |
| 2011/0066313 A1* | 3/2011 | Larsson | G01C 7/06 701/25 |
| 2016/0231426 A1* | 8/2016 | Smith | G01S 5/0263 |
| 2016/0341041 A1* | 11/2016 | Puura | G01C 7/06 |
| 2017/0234129 A1* | 8/2017 | Preston | E21D 9/1093 701/500 |
| 2019/0294898 A1* | 9/2019 | Jin | B60W 40/02 |
| 2019/0369255 A1* | 12/2019 | Davis | G01S 17/89 |
| 2020/0372664 A1* | 11/2020 | He | G01S 17/42 |

* cited by examiner

MACHINE GUIDANCE INTEGRATION

TECHNICAL FIELD

This invention relates to a mining machine and method whereby a mining machine can be controlled to move within an underground mine, such as, but not limited to, an underground coal mine.

BACKGROUND

Navigation of mining machines underground remains a challenge. In particular, satellite navigation is not available since the satellite signals do not penetrate through to the mining machine. Further, inertial navigation systems (INS) suffer from drift errors which accumulate over time. Therefore, there is a need for a more accurate solution for determining an absolute co-ordinate position of a mining machine.

SUMMARY

A system for controlling a mining machine within an underground mine comprises:

a rotatable laser source and return light sensor adapted to send laser light, receive reflected laser light and to provide an indication of distance and return light intensity at multiple different rotation angles;

at least one co-ordinate reference point, each comprising a pattern of varying reflectivity and each providing at least a 2D co-ordinate position, wherein each reference point is disposed at a wall or ceiling of the underground mine; and a processor connected to receive data relating to the indication of distance and return light intensity for determining an absolute co-ordinate position in space of the mining machine, the absolute co-ordinate position being determined at each of a plurality of locations of the mining machine as the mining machine moves through the underground mine, wherein the processor is configured to:
collect multiple intensity values of reflected laser light for multiple respective rotation angles,
detect the pattern of the reference point in the multiple intensity values of reflected laser light where multiple intensity values are collected across the pattern and the multiple intensity values indicate a contrast across the pattern due to the varying reflectivity of the pattern, and
determine the absolute co-ordinate position in space of the mining machine based on spatial information of the detected pattern.

The mining machine may be a continuous miner controlled to create a desired cut based on the absolute co-ordinate position in space of the continuous miner.

The pattern may be a pattern of a fiducial marker placed in the underground mine to aid navigation.

The pattern may encode information associated with the at least one co-ordinate reference point.

The pattern may be a rectangular pattern of dark and light areas.

The pattern may comprise a QR code or an ArUco code.

The spatial information may comprise one or more rotation angles of the laser source at which the co-ordinate reference point is detected.

The spatial information may comprise the indication of distance for the rotation angle at which the co-ordinate reference point is detected.

The spatial information may comprise a pose of the pattern relative to the mining machine.

Determining the absolute co-ordinate position in space of the mining machine may comprise determining a pose of the mining machine relative to the pattern.

Determining the absolute co-ordinate position in space of the mining machine may be based on a distance from the at least one co-ordinate reference point.

The processor may be further configured to
determine an identifier of the at least one co-ordinate reference point based on the pattern;
determine the at least 2D co-ordinate position of the at least one co-ordinate reference point based on the identifier; and
determine the absolute co-ordinate position in space of the mining machine based on the distance and the at least 2D co-ordinate position of the at least one co-ordinate reference point.

The processor may be configured to determine a direction angle from multiple reference points and perform triangulation to determine the absolute co-ordinate position in space of the mining machine.

Determining the absolute co-ordinate position in space of the mining machine may be based on data from one or more further sensors different to the return light sensor.

The one or more further sensors may comprise one or more of:
a camera to detect features in the underground mine and determine the absolute co-ordinate position of the mining machine based on locations of the features in a camera image;
a radar to detect a distance of features from the mining machine and determine the absolute co-ordinate position of the mining machine based on the distance; and
an inertial navigation system to determine a relative co-ordinate position of the mining machine.

Determining the absolute co-ordinate position in space of the mining machine may be based on a Kalman filter to fuse the further sensors with the spatial information of the detected pattern.

A method for navigation by a mining vehicle in an underground mine comprises:
collecting multiple intensity values of reflected laser light for multiple respective rotation angles of a source of the laser light,
detecting a pattern of a reference point in the multiple intensity values of reflected laser light where multiple intensity values are collected across the pattern and the multiple intensity values indicate a contrast across the pattern due to a varying reflectivity of the pattern, and
determining an absolute co-ordinate position in space of the mining machine based on spatial information of the detected pattern.

The mining machine may be a continuous miner and the method further comprises controlling the continuous miner to create a desired cut.

Optional features described in relation to the system or method or equally applicable to other aspects described herein, including the system and the method.

BRIEF DESCRIPTION OF DRAWINGS

An example will now be described with reference to the following drawings.

DESCRIPTION OF EMBODIMENTS

Navigation System

Figure 1:
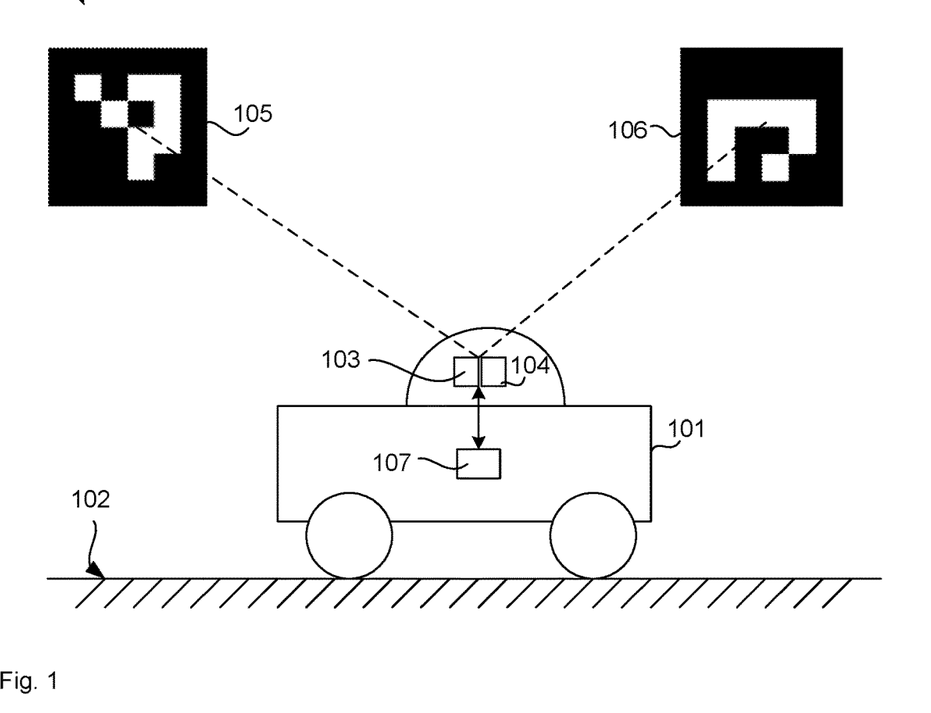
FIG. 1 illustrates a system for controlling a mining machine within an underground mine.

FIG. 1 illustrates a system 100 for controlling a mining machine 101 within an underground mine 102. System 100 comprises a rotatable laser source 103 adapted to send laser light and a return light sensor 104 adapted to receive reflected laser light and to provide an indication of distance and return light intensity at multiple different rotation angles and at least one co-ordinate reference point. The sensor 104 rotates with the laser source 103 to receive reflected laser light across the entire range of the laser source. An example device is Hokuyo UTM-30LX.

It is noted that the underground mine 102 may be a coal mine where methane gas is present in sufficiently high concentrations to pose an explosion or fire risk. For this reason, the laser source 103 is advantageously placed in a flame-proof enclosure, such as in a dome of glass or other material that is transparent to the laser light. For reflective materials, such as glass, it is also advantageous to place the laser source 103 and the sensor 104 such that the sensor is outside a light path of light that is reflected from an inside of the dome/enclosure. This reduces dazzling of the sensor by reflected laser light, which could lead to difficulties in sensing the laser light that is reflected by the surroundings. The laser source 103 may be spinning around a rotation axis continuously and emitting short pulses of laser light with the sensor 104 detecting the reflected light and measuring a time delay from sending the laser light to thereby calculate a distance based on the speed of light. The rate at which the laser sends the light pulses defines a step width in the rotation angle for each measurement. For example, in case of a full rotation per second (360 degrees per second) and a pulse rate of 720/s, there would be an angular resolution of 0.5 degrees between each measurement.

In the example of FIG. 1, there is also a first reference point 105 and a second reference point 106. Each of the reference points 105 and 106 comprises a pattern of varying reflectivity as shown in FIG. 1 as a pattern of dark and light contrasting squares. Therefore, these patterns or reference points are also referred to as "coded" features. Each reference point 105, 106 provides at least a 2D co-ordinate position. The reference points 105, 106 provide the at least 2D co-ordinate position in the sense that they can be used to determine that position. For example, the reference points 105, 106 (also referred to as markers herein) are installed within the underground mine at known points with known co-ordinate positions at a wall or ceiling of the underground mine. These known points may be measured by other means, such as surveying means or manual measurement of distances etc. from other known reference points or exploration drill sites. The co-ordinate position of each marker 105, 106 may also comprise a depth/altitude as a third dimension (3D). Further, the co-ordinate position may be a position within a co-ordinate system of the mine itself, such as relative to an origin that is within or near the mine. Such a co-ordinate is also considered absolute as it anchors the position within the global reference frame of latitude and longitude. This is in contrast to relative co-ordinate positions, which are relative to a previous position or relative to mining machine 101, for example. Relative co-ordinate positions include positions relative to previous positions obtained by dead-reckoning in an inertial navigation system.

Data Processing

Mining machine 101 comprises a processor 107 connected to the rotatable laser source 103 and the light sensor 104 to receive data relating to the indication of distance and return light intensity. Processor 107 may be connected directly so as to monitor the rotation signal and the light sensor output. Alternatively, processor 107 may be connected indirectly, such as via an output port or data port of a laser range finder. For example, processor 107 may receive a data stream of values for rotation angle, distance and return intensity for each rotation angle value. It is noted that the rotation angle may have two elements, such as azimuth angle and inclination (or polar/elevation) angle. This may alternatively referred to as horizontal and vertical angles. This means one pair of azimuth and inclination value is considered as one rotation angle value and for each rotation angle value, processor 107 receive a distance value and a return intensity of reflected light, such as a value between 0 and 255. Processor 107 can now use these angles and return intensities, potentially with the distance values, for determining an absolute co-ordinate position in space of the mining machine 101. Processor 107 determines this absolute co-ordinate position at each of a plurality of locations of the mining machine as the mining machine moves through the underground mine 102.

Figure 6:
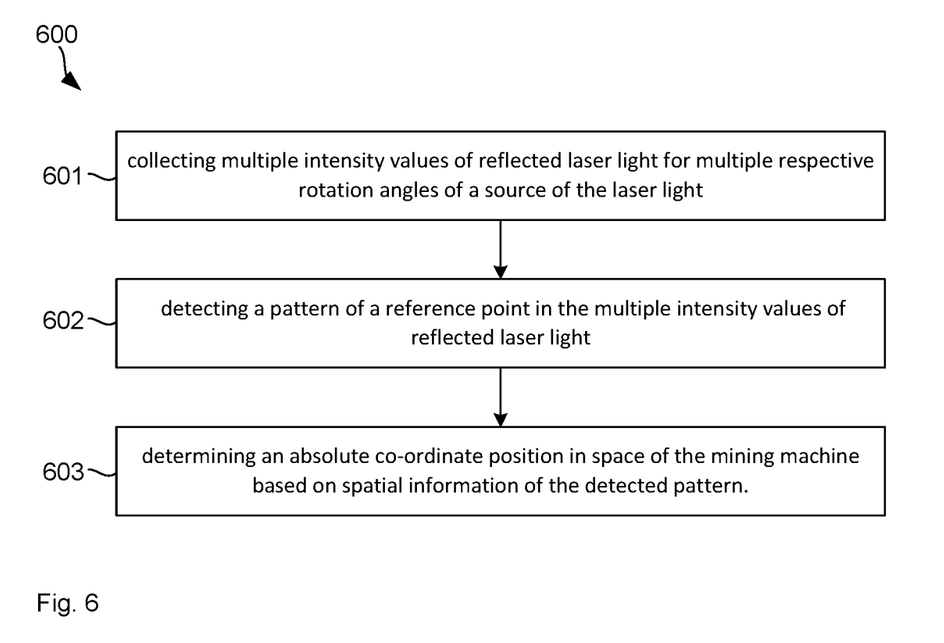
FIG. 6 illustrates a method for navigation by a mining vehicle in an underground mine.

More particularly, processor 107 is configured to perform the following steps, which are also shown in FIG. 6. That is, processor 107 collects multiple intensity values of reflected laser light for multiple respective rotation angles to generate a 'coloured' point cloud. The point cloud is similar to point clouds generated by laser range finders but 'coloured' in the sense that each point has an intensity ('colour') associated with it. Of course, this is more a grey scale value as the intensity value is only one dimensional (due to the monochromaticity of the laser), but it can be mapped to a colour of a colour scale for visualisation. Within the coloured point cloud, processor 107 now detects the pattern of the reference points 105, 106 in the multiple intensity values of reflected laser light. It is noted that the multiple intensity values are collected across each of the patterns and the multiple intensity values indicate a contrast across the pattern due to the varying reflectivity of the pattern. In other words, processor 107 detects areas of high reflectivity, which relate to the white areas in the patterns. Processor 107 may also detect areas of low reflectivity, which relate to black areas in the patterns. However, these may not be detectable at all and processor 107 then treats missing points in the point cloud as black points.

Processor 107 can then determine the absolute co-ordinate position in space of the mining machine 101 based on spatial information of the detected pattern. The spatial information of the detecting pattern may include a relative direction of the pattern from the mining machine, which may be identical to the azimuth of the laser or in a fixed offset thereof. The direction may also include an inclination if 3D navigation is desired. The spatial information may also include the distance of the pattern from the mining machine. It is noted that the pattern typically covers multiple points of reflected intensity, the actual direction/distance of the pattern may be the azimuth/inclination/distance of the centre point of all points belonging to the pattern.

Further spatial information of the pattern may also comprise the absolute co-ordinate position of the pattern as stored either on mining machine 101 or on an external computer system as described further below.

In one example, mining machine 101 is a continuous miner controlled to create a desired cut based on the absolute co-ordinate position in space of the continuous miner. In this sense, the continuous miner navigates through the underground mine based on the determined absolute co-ordinate position and cuts material so as to create the desired cut. This may involve calculating a spatial difference between the current position and the desired cut and correcting the current position to thereby control the cut that is achieved, noting that there is typically a fixed spatial relationship between the cutting heads and the mining machine 101. In this context, the reference points 105, 106 may be located behind the continuous miner, that is, in a part of the underground mine where the actual achieved cut is already essentially equal to the desired cut. The laser 104 can then detect the markers 105, 106 to determine the accurate current position Reference Points It is noted that various different types of patterns may be used, which may be summarised as patterns of fiducial markers. A fiducial marker or simply "fiducial" is an object placed in the field of view of an imaging system which appears in the image produced, for use as a point of reference or a measure. Here, it is placed in the field of view of the rotatable laser source 104, that is, the marker is placed in the underground mine to aid navigation.

While the rotatable laser source 104 is active and therefore, physically different to an imaging system, such as an optical camera, it is possible to use existing software libraries such as Point Cloud Library, or OpenCV to detect the patterns of the fiducial markers in the point cloud data, using the intensity values as pixel values, and the rotation angle (azimuth/elevation) as pixel coordinates for the software library.

It is noted that processor 107 may use only the intensity data to identify the patterns. However, it is also possible to calculate a filter based on the distance data and apply that filter to the intensity data. For example, the patterns are typically applied to a relatively flat surface. As a result, the variation in distance measures across the flat surface should be relatively low. In contrast, most other surfaces in mine 101, such as rock walls, ceilings, etc. are relatively rough with a high variation in distance measures. Therefore, processor 107 can calculate a variance in the distance measurements across a range of angles, such as a patch of 1 degree. If the variance is above a threshold, the intensity values of that patch are disregarded for the pattern identification. Vice versa, if the variance is below the threshold, the intensity values are used.

When processor 107 detects the marker and determines an x/y pixel co-ordinate, processor 107 can map that back to the rotation angle by virtue of a stored mapping between the pixel co-ordinates and the rotation angles. For example, the laser may be rotatable about 360 degrees azimuth and 90 degrees elevation and provide an angular sampling rate, that is, a delta angle between each consecutive intensity value. Processor 107 can use this delta angle to calculate the rotation angle in azimuth and elevation for any pixel co-ordinate of the image representing the point cloud.

While the markers serve as reference points, their pattern may also encode information associated with the at least one co-ordinate reference point. Importantly, the pattern may encode an identifier of the marker. Processor 107 can use this identifier as a look-up key in a database where the absolute position of that marker is stored. With the absolute co-ordinate position of the marker and the angle towards that marker as described above, processor 107 can perform triangulation to determine the absolute co-ordinate position of the mining machine 101. Further information may also be encoded into the marker or stored in the database, such as whether the marker is on a wall or ceiling, pose of the marker or whether the marker is at a turning point or corner or other significance of the position within the underground mine.

In one example, the pattern is a rectangular pattern of dark and light areas as shown in FIG. 1, which may comprise a QR code or an ArUco code. An ArUco code is a pattern from a dictionary of patterns, which can be generated by an automatic method. The first step is setting the size of the markers to n×n, where n can be chosen to trade-off between the number of different patterns in the library and the readability/size of the patterns. In this example, n is chosen to be 4, so each pattern contains 16 squares of black and white. The generation algorithm starts from an empty dictionary D that is incrementally populated with new markers. At each iteration of the algorithm, a marker is selected based on a stochastic process that assigns more probability to markers with a higher number of bit transitions and whose words have not been yet added to D. If the distance (e.g. Hamming distance) between the generated marker and these in D is greater than a minimum value τ, then it is added. Otherwise, the marker is rejected and a new marker is randomly selected. The process stops when the required number of markers is achieved.

Further details about generating and detecting ArUco codes can be found in: S. Garrido-Juradon, R. Muñoz-Salinas, F. J. Madrid-Cuevas, M. J. Marin-Jiménez, "Automatic generation and detection of highly reliable fiducial markers under occlusion", Pattern Recognition 47 (2014) 2280-2292, which is included herein by reference.

Figure 2:
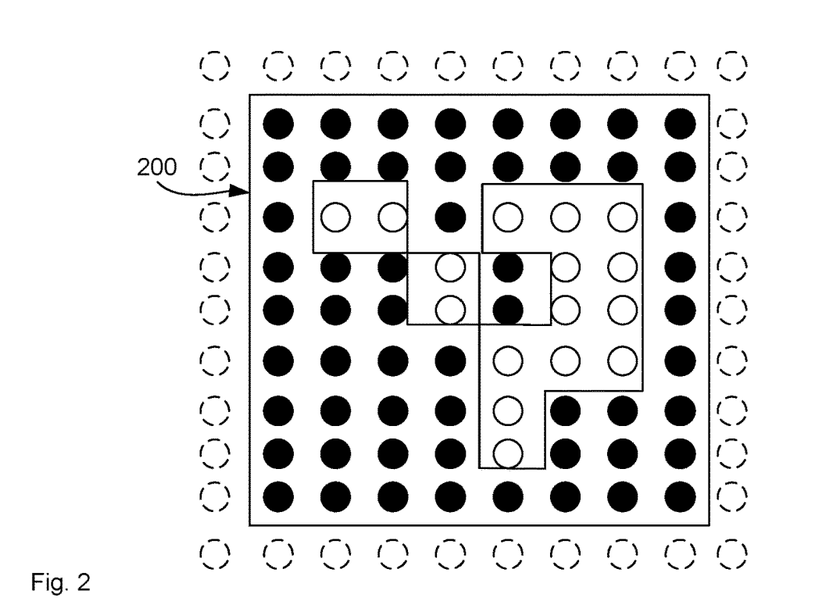
FIG. 2 illustrates the pattern of one of the reference points of FIG. 1 in more detail.

FIG. 2 illustrates the pattern 200 of reference 105 point in more detail. In particular, FIG. 2 illustrates the intensities of reflected light as sensed by sensor 104 across the pattern 200. Each reflected intensity is represented by a circle indicating the point on the pattern 200 where the laser hits the pattern when the intensity is measured. White circles indicate relatively high intensity indicating a high reflectance due to white arears while black circles indicate relatively low intensity indicating low reflectance due to black areas in pattern 200. Dashed circles represent points with a greater measured distance that the solid circles indicating that the points of the dashed circles are behind the plane of the pattern 200. This can be used to filter the measurements of the dashed circles or to aid edge detection to isolate the pattern from the rest of the point cloud. That is, edge detection may be performed on the distance data as this should result in a sharp edge between the flat surface of the pattern and rugged surfaces around the pattern.

It is noted again that each circle corresponds to a rotation angle of the laser 103 but in the illustration of FIG. 2, those angles are projected onto a planar two-dimensional surface. In this way, the circles (i.e. the intensities represented by the circles) can be used as pixel values in a two-dimensional image. In this sense, FIG. 2 also illustrates an image that can be provided to a pattern detection algorithm to detect the pattern and thereby identify marker 105. It is noted that the solid lines in FIG. 2 are added for clarity but they are not part of the image. In fact, the pattern detection algorithm determines the lines as indicating the identified pattern as shown at 105 in FIG. 1.

Navigation

In one example, the pose of mining machine 101 is known (such as from magnetic or inertial measurements) and therefore, the direction to the reference point relative to true north is available. Further, the laser measurement provides the distance to the reference point. The direction and the distance can then be used to determine the absolute co-ordinate position of the mining machine simply by adding the direction/distance vector to the absolute co-ordinate position of the reference point. Further examples include triangulation and trilateration.

Figure 3:
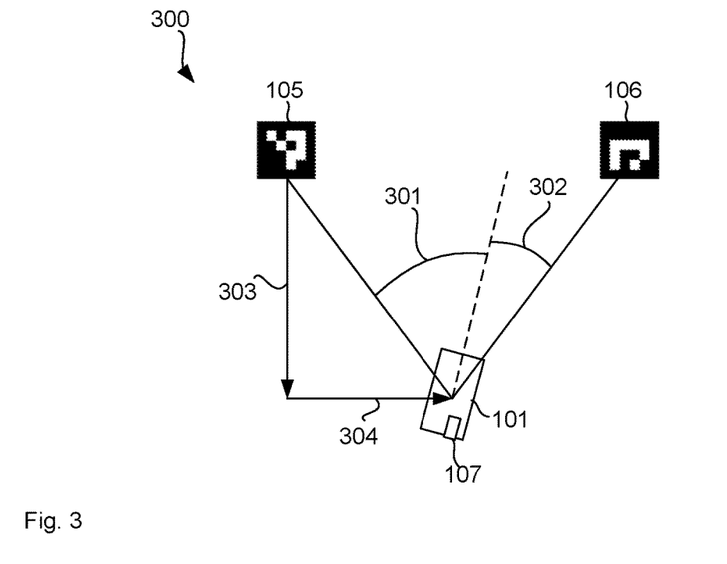
FIG. 3 illustrates a triangulation scenario.

FIG. 3 illustrates a triangulation scenario 300 where processor 107 measures angles 301 and 302 towards markers 105 and 106, respectively. Processor 107 may also have a north direction (i.e. pose) available to determine the bearing angles α and β relative to north. The pose may be available from earth gravity vector, earth magnetic field, inertial navigation, or others, noting that typical errors in the pose do not lead to large errors in the absolute co-ordinate position because the pose errors are not accumulated as they are in dead reckoning. Processor 107 can then calculate the y-coordinate position 303 by $$y = l \frac{\sin \alpha \, \sin \beta}{\sin(\alpha + \beta)},$$

where l is the distance between markers 105 and 106. In this sense, the spatial information of the detected pattern comprises rotation angles 301 of the laser source at which the co-ordinate reference point is detected. Once the y-coordinate position 303 is available, the x-coordinate position 304 can be calculated relatively easily.

Figure 4:
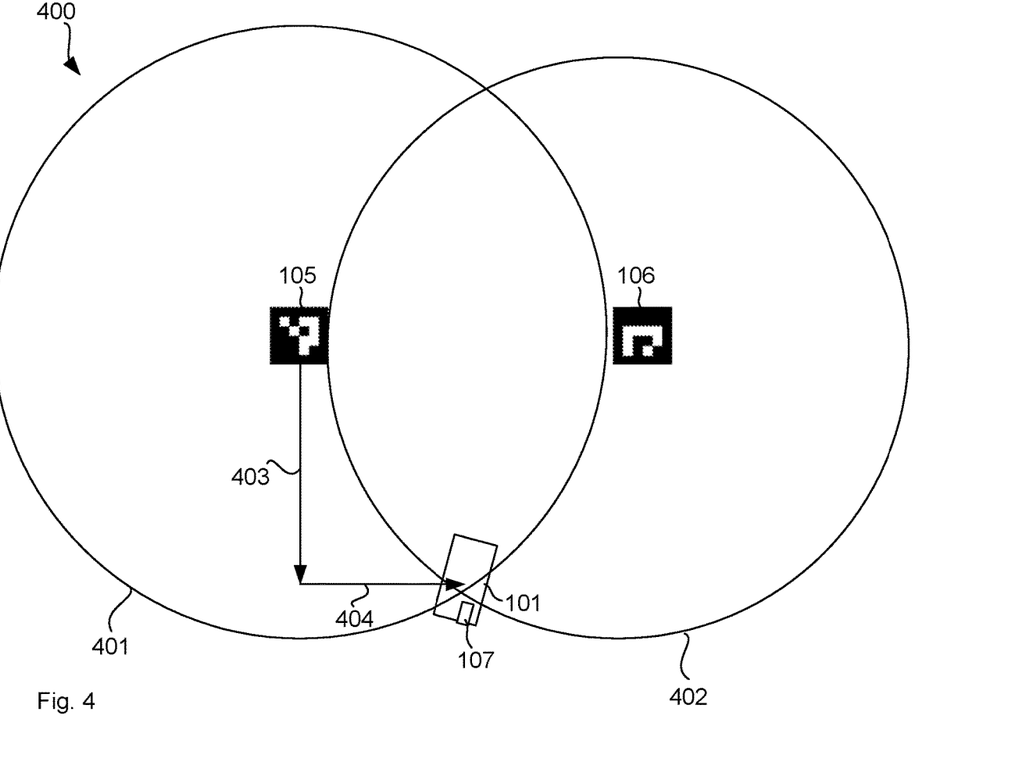
FIG. 4 illustrates a trilateration scenario.

FIG. 4 illustrates a trilateration scenario 400 where processor 107 measures distances 401 and 402 from markers 105 and 106, respectively, as indicated by circles. Processor 107 can the apply trilateration to calculate the co-ordinate position of mining machine 101. In particular, processor 107 can calculate x-coordinate position 404 and y-coordinate position 403 by:

$$x = \frac{r_1^2 - r_2^2 + U^2}{2U}$$

$$y = \pm \sqrt{r_1^2 - x_2}$$

where r is the distance and U is the separation between the two markers 105 and 106. In this sense determining the absolute co-ordinate position in space of the mining machine 101 is based on a distance from the co-ordinate reference points 105 and 106.

Both, distance and angle, can be combined such that the spatial information of the detected pattern comprises an indication of distance for the rotation angle at which the co-ordinate reference point is detected. This way, processor 107 uses all the available information, including direction angles towards the markers as well as distance from the markers to calculate the absolute co-ordinate position accurately. That is, the ambiguity in y is resolved by determination of relative angles to the co-ordinate reference points 105 and 106.

It is further noted that the perceived shape of the markers 105 changes from the viewing angle, that is, the angle between the laser beam and the surface normal of the pattern. This can be used by an algorithm to estimate the pose of the mining machine 101 relative to the pattern. This pose information can also be used as an angle to calculate the position of mining machine 101.

In one example, processor 107 determines an identifier of the co-ordinate reference point 105, 106 based on the pattern. Each possible ArUco pattern may be directly associated with a number in the sense that ArUco patterns can be generated for numbers 1, 2, 3 and so on. In other words, the pattern dictionary may be indexed by an integer variable. Alternatively, the pattern may present a code that encodes a number or other identifier, such as in a QR code. Processor 107 can then use the extracted identifier as a look-up value in a database to obtain the absolute co-ordinate positions of the reference points 105, 106 and then use these positions together with the measured distances and/or angles to calculate the absolute co-ordinate position of mining machine 101 as set out above.

Data Fusion

It is further possible to fuse data from different sensors such that determining the absolute co-ordinate position in space of the mining machine is based on data from one or more further sensors different to the return light sensor. For example, mining machine 101 may comprise an inertial navigation system that provides a relative co-ordinate position or even an estimate of an absolute co-ordinate position. Mining machine 101 may also comprise a radar, visible camera or infrared sensor to determine a further estimate of an absolute co-ordinate position based on visible and/or geological features, such as coal seam features including marker bands, strata height, etc.

The image data from the camera may also be provided to the pattern detection algorithm. Due to a constant spatial relationship between the camera and the laser, the laser point cloud can be registered with the camera image. In other words, a mapping can be determined between the point cloud and the camera image. This may be achieved by a calibration procedure where fiducial markers are placed into the field of view of the camera and the laser at the same time and the camera pixels and the laser points showing the same marker can be assigned to each other.

The camera may detect features in the underground mine and the processor 107 may determine the absolute co-ordinate position of the mining machine based on locations of the features in a camera image. Further, a radar may detect a distance of features from the mining machine and determine the absolute co-ordinate position of the mining machine based on the distance.

In a further example, determining the absolute co-ordinate position in space of the mining machine is based on a Kalman filter. This essentially means fusing the further sensors with the spatial information of the detected pattern. More particularly, the state space of mining machine 101 comprises the position, pose, rotation rate and the velocity of the mining machine 101. The absolute co-ordinate position estimated by detecting the markers 105, 106 together with the velocities from the inertial navigation system and any further sensor input form an observation vector. The Kalman filter can then calculate weights for each observation to optimise the accuracy of the co-ordinate position over time.

In yet a further example, mining machine 101 may fall-back on inertial navigation when processor 107 identifies no reference point, due to occlusion or dust for example. Once the reference point is again visible to the laser/sensor, processor 107 can correct the now inaccurate co-ordinate position based on the spatial information of the reference point. In a further example, the reference points may not encode any information in the pattern. However, the relative separation of the location of the reference points allows an inference of both the identity of the reference points and allows for processing of absolute location of the machine from these now known reference points.

Example Scenario

Figure 5:
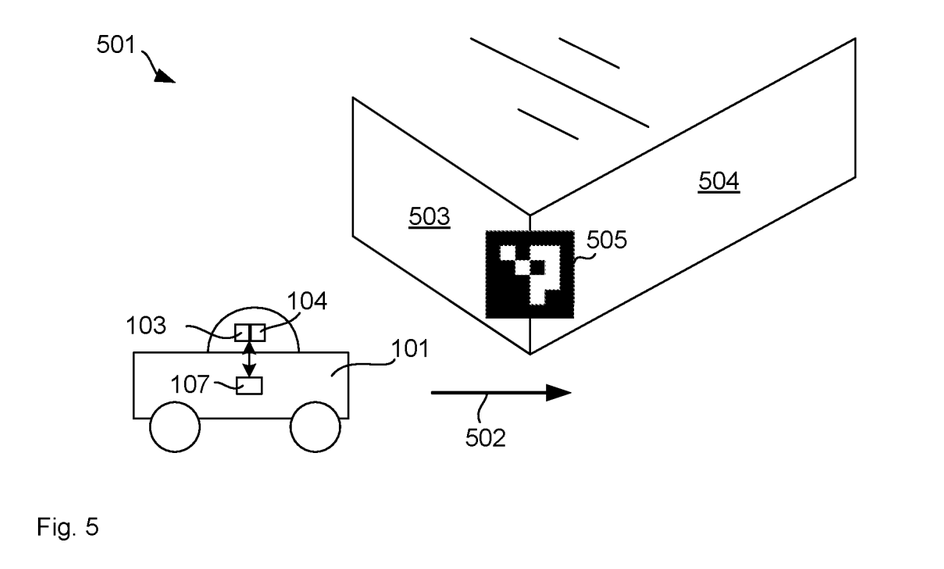
FIG. 5 illustrates an example navigation scenario.

FIG. 5 illustrates an example scenario where mining machine 101 moves through an underground mine 501 as indicated by arrow 502. Underground mine 501 comprises a first side wall 503 and a second side wall 504. At the junction between first side wall 503 and second side wall 504 there is a co-ordinate reference point 505 shown as a pattern of varying reflectivity forming an ArUco code. When mining machine 101 is far away from reference point 505, there may be an insufficient number of laser points across the pattern to identify the pattern correctly but as mining machine 101 moves closer, the pattern becomes identifiable.

For example, at a distance of 10 m from the reference point and an angular resolution of 0.1 deg, the distance between laser points on the pattern (spatial resolution) is about 17 mm (sin(0.1)*10 m). So if the pattern has a size of about 1 m by 1 m, there would be about 50 by 50 laser points (2500 total) across the pattern. This should be sufficient for detecting the pattern accurately. For a distance of 200 m, this spatial resolution reduces to 2 by 2 laser points (4 total), which may not be sufficient since there may not be at least one laser point in each square.

Once processor 107 detects the pattern and obtains the absolute co-ordinate position of the pattern, processor 107 can use this to determine the absolute co-ordinate position of the mining machine as described above. Processor 107 may repeat this process every 20 ms, every 1 s or at other intervals and navigate accordingly. For example, mining machine 101 may move along first side wall 503 until it reaches the corner with second side wall 504. Mining machine 101 may then turn to change direction and follow second side wall 504. Mining machine 101 may also follow a pre-configured travel path consisting of waypoints of absolute co-ordinate positions within underground mine 501. Further, mining machine 101 may transmit the current co-ordinate position to a remote operator to allow remote control of mining machine 101.

Method

FIG. 6 illustrates a method 600 for navigation by a mining vehicle in an underground mine. The method may be performed by processor 107 or by another computer system, which may be located on the mining machine, in the underground mine or externally, such as in a remote control centre. The method may be implemented in computer program code stored on non-volatile, computer readable storage media. The computer program code is the compiled and stored on program memory of the processor or computer system from where it is executed and causes the processor or computer system to perform the steps of method 600. The steps of method 600 have been described in essence above, so the disclosure above applies to the steps of method 600.

In this sense, the processor collects 601 multiple intensity values of reflected laser light for multiple respective rotation angles of a source of the laser light. The collection may be by controlling or interfacing to a laser range finder that provides intensity values and angle values. The processor then detects a pattern, such as ArUco or others, of a reference point in the multiple intensity values of reflected laser light. The multiple intensity values are collected across the pattern and the multiple intensity values indicate a contrast across the pattern due to a varying reflectivity of the pattern.

The processor then determines an absolute co-ordinate position in space of the mining machine based on spatial information of the detected pattern. As described above, the mining machine may be a continuous miner and the processor may control the continuous miner to create a desired cut. The desired cut may be a cut designed by a mining engineer or automatically. This may be based on estimated or measured locations of a coal seam to extract the coal optimally from the underground mine. In further examples, the desired cut is a location of a gate road that is to be created by the continuous miner so as to facilitate later long-wall mining.

Test Data

In one example, the laser 103/sensor 104 generate 1080*40=43200 points per second with scans of 6 degrees per second, which means 60*43,200=2,592,000 points per scan. This can be increased or decreased as required.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for controlling a mining machine within an underground mine, the system comprising:
 a rotatable laser source and return light sensor adapted to send laser light, receive reflected laser light and to provide an indication of distance and return light intensity at multiple different rotation angles;
 at least one co-ordinate reference point, each comprising a pattern of varying reflectivity and each providing at least a 2D co-ordinate position, wherein
  each reference point is disposed at a wall or ceiling of the underground mine,
  the pattern is an arrangement of varying reflectivity in each of two dimensions, and
  the pattern encodes information associated with the co-ordinate reference point; and
 a processor connected to receive data relating to the indication of distance and return light intensity for determining an absolute co-ordinate position in space of the mining machine, the absolute co-ordinate position being determined at each of a plurality of locations of the mining machine as the mining machine moves through the underground mine,
 wherein the processor is configured to:
  collect multiple intensity values of reflected laser light for multiple respective rotation angles to generate a point cloud of the collected multiple intensity values,
  detect the pattern of varying reflectivity of the reference point in the point cloud of the multiple intensity values of reflected laser light where plural intensity values are collected across the pattern and the plural intensity values indicate a contrast across the pattern due to the varying reflectivity of the pattern,
  extract, from the detected pattern, the encoded information associated with the reference point,
  determine spatial information using the extracted information, and
  determine the absolute co-ordinate position in space and a pose of the mining machine based on the spatial information of the detected pattern, by determining the pose of the mining machine relative to the reference point from a shape of the pattern perceived by the return light sensor at a viewing angle of the pattern, wherein the viewing angle is an angle between the laser light and a surface normal of the reference point.

2. The system of claim 1, wherein the mining machine is a continuous miner controlled to create a desired cut based on the absolute co-ordinate position in space of the continuous miner.

3. The system of claim 1, wherein the pattern is a pattern of a fiducial marker placed in the underground mine to aid navigation.

4. The system of claim 1, wherein the pattern is a rectangular pattern of dark and light areas.

5. The system of claim 4, wherein the pattern comprises a QR code or an ArUco code.

6. The system of claim 1, wherein the spatial information comprises one or more rotation angles of the laser source at which the co-ordinate reference point is detected.

7. The system of claim 1, wherein the spatial information comprises the indication of distance for the rotation angle at which the co-ordinate reference point is detected.

8. The system of claim 1, wherein the processor is configured to
   determine an identifier of the at least one co-ordinate reference point based on the pattern;
   determine the at least 2D co-ordinate position of the at least one co-ordinate reference point based on the identifier; and
   determine the absolute co-ordinate position in space of the mining machine based on the distance and the at least 2D co-ordinate position of the at least one co-ordinate reference point.

9. The system of claim 1, wherein the processor is configured to determine a direction angle from multiple reference points and perform triangulation to determine the absolute co-ordinate position in space of the mining machine.

10. The system of claim 1, wherein determining the absolute co-ordinate position in space of the mining machine is based on at least one of (i) a distance from the at least one co-ordinate reference point, and (ii) data from one or more further sensors different to the return light sensor.

11. The system of claim 10, wherein the one or more further sensors comprise one or more of:
   a camera to detect features in the underground mine and determine the absolute co-ordinate position of the mining machine based on locations of the features in a camera image;
   a radar to detect a distance of features from the mining machine and determine the absolute co-ordinate position of the mining machine based on the distance; and
   an inertial navigation system to determine a relative co-ordinate position of the mining machine.

12. The system of claim 10, wherein determining the absolute co-ordinate position in space of the mining machine is based on a Kalman filter to fuse the further sensors with the spatial information of the detected pattern.

13. A method for navigation by a mining vehicle in an underground mine, the method comprising:
   collecting multiple intensity values of reflected laser light for multiple respective rotation angles of a source of the laser light to generate a point cloud of the collected multiple intensity values;
   detecting a pattern of varying reflectivity of a reference point in the point cloud of the multiple intensity values of reflected laser light where plural intensity values are collected across the pattern and the plural intensity values indicate a contrast across the pattern due to the varying reflectivity of the pattern, the pattern being an arrangement of varying reflectivity in each of two dimensions, and the pattern encoding information associated with a co-ordinate reference point;
   extracting, from the detected pattern, the encoded information associated with the reference point;
   determining spatial information using the extracted information; and
   determining an absolute co-ordinate position in space and a pose of the mining machine based on the spatial information of the detected pattern, by determining the pose of the mining machine relative to the reference point from a shape of the pattern perceived by a return light sensor at a viewing angle of the pattern, the viewing angle being an angle between the laser light and a surface normal of the reference point.

14. The method of claim 13, wherein the mining machine is a continuous miner and the method further comprises controlling the continuous miner to create a desired cut.

15. The method of claim 13, wherein each of the multiple respective rotation angles is a rotation angle in azimuth and elevation, and the point cloud is an arrangement of points, in at least two-dimensions and associated with the collected multiple intensity values for the multiple respective rotation angles.

16. A non-transitory computer-readable medium with executable code stored thereon that, when executed by a computer, causes the computer to perform the method of claim 13.

* * * * *